United States Patent
Naitou et al.

(10) Patent No.: US 7,805,240 B2
(45) Date of Patent: Sep. 28, 2010

(54) DRIVING BEHAVIOR PREDICTION METHOD AND APPARATUS

(75) Inventors: Takahiro Naitou, Kariya (JP); Takafumi Itoh, Toyota (JP)

(73) Assignee: DENSO CORPORATION, Kariya (JP)

( * ) Notice: Subject to any disclaimer, the term of this patent is extended or adjusted under 35 U.S.C. 154(b) by 395 days.

(21) Appl. No.: 11/984,576

(22) Filed: Nov. 20, 2007

(65) Prior Publication Data
US 2008/0120025 A1 May 22, 2008

(30) Foreign Application Priority Data
Nov. 22, 2006 (JP) ............... 2006-316289

(51) Int. Cl.
*G01C 21/00* (2006.01)
(52) U.S. Cl. ............... 701/207; 701/32; 701/33; 701/36; 340/438; 340/439
(58) Field of Classification Search ............ 701/29, 701/32, 33, 36, 207, 300; 340/425.5, 438, 340/439
See application file for complete search history.

(56) References Cited

U.S. PATENT DOCUMENTS

2006/0259219 A1 * 11/2006 Wakiyama et al. ............ 701/36
2009/0005961 A1 * 1/2009 Grabowski et al. ........... 701/200
2009/0138155 A1 * 5/2009 Wakiyama et al. ............ 701/36

FOREIGN PATENT DOCUMENTS

| JP | A-11-99847 | 4/1999 |
|----|------------|--------|
| JP | A-11-99849 | 4/1999 |
| JP | A-2002-331850 | 11/2002 |

* cited by examiner

*Primary Examiner*—Gertrude Arthur Jeanglaud
(74) *Attorney, Agent, or Firm*—Posz Law Group, PLC

(57) ABSTRACT

A driving behavior prediction apparatus includes, for accurately predicting a driving behavior, a position calculation unit for a subject vehicle position calculation, a route setting unit for setting a navigation route, a distance calculation unit for calculating a distance to a nearest object point, a parameter storage unit for storing a template weighting factor that reflects a driving operation tendency of a driver, a driving behavior prediction unit for predicting a driver's behavior based on vehicle information and the template weighting factor, a driving behavior recognition unit for recognizing driver's behavior at the object point, and a driving behavior learning unit for updating the template weighting factor so as to study the driving operation tendency of the driver in a case that a prediction result by the driving behavior prediction unit agrees with a recognition result by the driving behavior recognition unit.

15 Claims, 9 Drawing Sheets

DRIVING BEHAVIOR PREDICTION METHOD AND APPARATUS

CROSS REFERENCE TO RELATED APPLICATION

This application is based on and claims the benefit of priority of Japanese Patent Application No. 2006-316289 filed on Nov. 22, 2006, the disclosure of which is incorporated herein by reference.

FIELD OF THE DISCLOSURE

The present disclosure generally relates to a driving behavior prediction method and apparatus for use in a vehicle.

BACKGROUND INFORMATION

There have been such known driving support systems as lane keeping assistance systems and adaptive cruise control (ACC) systems. In such driving support systems, the driving behavior of a driver must be supported appropriately; otherwise the support provided may become a burden on the driver. It is therefore important that the driving behavior of the driver be predicted accurately and that a support appropriate for the driving behavior of the driver be provided. Hence, driving behavior prediction apparatuses for predicting the driving behavior of a driver have been proposed.

In the driving behavior prediction apparatus described in the patent document 1, for example, the driving behavior of a driver is predicted by a statistical method using a hidden Markov model which is generally used for voice recognition. To be concrete, the driving behavior prediction apparatus is provided with plural models which correspond to driving behaviors (for example, turning right or left, and running straight) to be objects of recognition. Each of such models outputs an occurrence probability of the corresponding driving behavior by having driving data inputted, the driving data being represented by, for example, the depth to which the accelerator pedal is depressed, the depth to which the brake pedal is depressed, and the vehicle speed and acceleration. Thus, such models are generated based on driving data collected when driving behaviors to be objects of driving behavior prediction are practiced. The models calculate the occurrence probabilities of driving behaviors corresponding to them, respectively, by having actual driving data inputted, and the driving behavior corresponding to the model with the highest occurrence probability is predicted to be the driving behavior the driver will actually practice. In the driving behavior prediction apparatus using a hidden Markov model, to make the apparatus compatible with the driving behavior characteristics of various drivers, driving behavior patterns are recognized using models generated based on plural driving data. In the driving behavior prediction apparatus, unless the models are generated using driving data not much different from actual driving data, the result of predicting a driving behavior may differ from the driving behavior actually practiced by the driver, as a result, causing the driving behavior prediction accuracy to decline. Therefore, to accurately predict the driving behavior of each of plural drivers, it is necessary to generate and use models corresponding to individual drivers.

The driving behavior prediction apparatus described in the patent document 2 is provided with a storage device storing driving data corresponding to the driver of the own vehicle. In the driving behavior prediction apparatus, for model learning corresponding to the driver of the own vehicle, models required for a hidden Markov model are generated based on the driving data stored in the storage device.

(Patent Document 1) JP-A-H11-99849
(Patent Document 2) JP-A-2002-331850

In the driving behavior prediction apparatus configured as described in the patent document 2, however, model learning is conducted based only on the driving data showing driving behaviors of the driver of the own vehicle. Therefore, even in cases where a same driving behavior is repeated by the same driver, the driving data collected contains intra-individual differences which may result in cases where an actual driving behavior and a predicted driving behavior for the same person do not agree. This causes a problem that the results of model learning do not necessarily lead to improvement in the accuracy of driving behavior prediction.

SUMMARY OF THE DISCLOSURE

The present invention has been made in view of the above and other problems, and it is an object of the present invention to provide a driving behavior prediction method and apparatus capable of driving behavior prediction with high accuracy.

In the driving behavior prediction method aimed at achieving the above object, position information indicating a current position of an own vehicle is acquired in the first step. In the second step, route information representing a driving route to be followed by the own vehicle is acquired. In the third step, based on the position information acquired in the first step and the route information acquired in the second step, a distance to an object point indicated by the route information is determined. In the fourth step, driving data is acquired, the driving data including information on a speed of the own vehicle and information on vehicle operation performed by the driver to affect the running condition of the own vehicle.

In the fifth step, when the distance determined in the third step is not greater than a predetermined permissible distance, how the driver will behave at the object point is predicted based on a history of the driving data acquired in the fourth step, a plurality of templates representing typical driving behavior patterns of the driver, and weighting factors for the templates.

In the sixth step, a driving behavior actually practiced by the driver at the object point is recognized. In the seventh step, the driving behavior predicted in the fifth step and the driving behavior recognized in the sixth step are compared and, when the predicted driving behavior and the recognized driving behavior agree, the weighting factor for the template used to predict the driving behavior agreeing with the recognized driving behavior is updated to increase the reliability of the template in predicting the driving behavior.

Namely, in the driving behavior prediction method of the present invention, the driving tendency of a driver is learned by updating the template weighting factor so as to cause the prediction made in the fifth step and the recognition made in the sixth step to agree.

According to the driving behavior prediction method configured as described above, learning is made to cause the driving behavior actually practiced by the driver to be reflected in driving behavior prediction, so that the accuracy of driving behavior prediction made in the fifth step can be improved.

Secondary, in the driving behavior prediction apparatus, a position information acquisition unit acquires position information indicating a current position of an own vehicle, and a route information acquisition unit acquires route information representing a driving route to be followed by the own vehicle. Furthermore, a distance calculation unit determines, based on the position information acquired by the position information acquisition unit and the route information acquired by the route information acquisition unit, an object point distance which is a distance to an object point indicated by the route information. The position information acquisition unit, the route information acquisition unit, and the distance calculation unit may have configurations similar to those used in a well-known car navigation system. The object point may be, for example, a spot (branching point such as an intersection) which is included in the driving route and at which the driver can determine whether to run straight through or turn or a spot (such as an intersection or railroad crossing) where the vehicle is required to stop once.

Also, in the driving behavior prediction apparatus, a driving data acquisition unit acquires driving data including information on the speed of the own vehicle and information on vehicle operation performed by the driver to affect the running condition of the own vehicle. Furthermore, with the driving behavior prediction apparatus being provided with a template storage unit which stores a plurality of templates representing typical driving behavior patterns of the driver and a weight storage unit which stores a weighting factor for each of the plurality of templates, a driving behavior prediction unit included in the driving behavior prediction apparatus predicts, when the distance determined by the distance calculation unit is not greater than a predetermined permissible distance, how the driver will behave at the object point based on a history of the driving data acquired by the driving data acquisition unit, the plurality of templates stored in the template storage unit, and the weighting factors stored in the weight storage unit. Since the driving behavior prediction unit predicts a driving behavior of the driver based on a history of driving data including information on the speed of the own vehicle and the vehicle operation performed by the driver, it is possible to predict how the driver will behave at an object point before the driver actually initiates a concrete behavior (for example, giving a turn signal before turning at a branching point included in the driving route).

Furthermore, in the driving behavior prediction apparatus, a driving behavior recognition unit recognizes a driving behavior actually practiced by the driver at the object point, and a first weight update unit compares the driving behavior predicted by the driving behavior prediction unit and the driving behavior recognized by the driving behavior recognition unit. When the predicted driving behavior agrees with the recognized driving behavior, the weighting factor for the template used to predict the driving behavior agreeing with the recognized driving behavior is updated to increase the reliability of the template in predicting the driving behavior.

Namely, the driving behavior prediction apparatus is an apparatus which realizes the driving behavior prediction method described above. Hence, effects similar to those obtained by using the driving behavior prediction method can be obtained using the driving behavior prediction apparatus.

In the driving behavior prediction apparatus, the first weight update unit preferably updates the weighting factor to increase the reliability of the template when the object point distance at the time when the driving behavior prediction unit predicted the driving behavior was greater.

According to the driving behavior prediction apparatus configured as described above, the earlier a correct prediction is made prior to reaching of the own vehicle to the object point, the greater the reliability of a template that has enabled the correct prediction can be. This improves the prediction accuracy in making an early prediction of the driving behavior of the driver at the object point, and thus the driving behavior prediction timing can be improved.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention will be described below with reference to the drawings.

Figure 1:
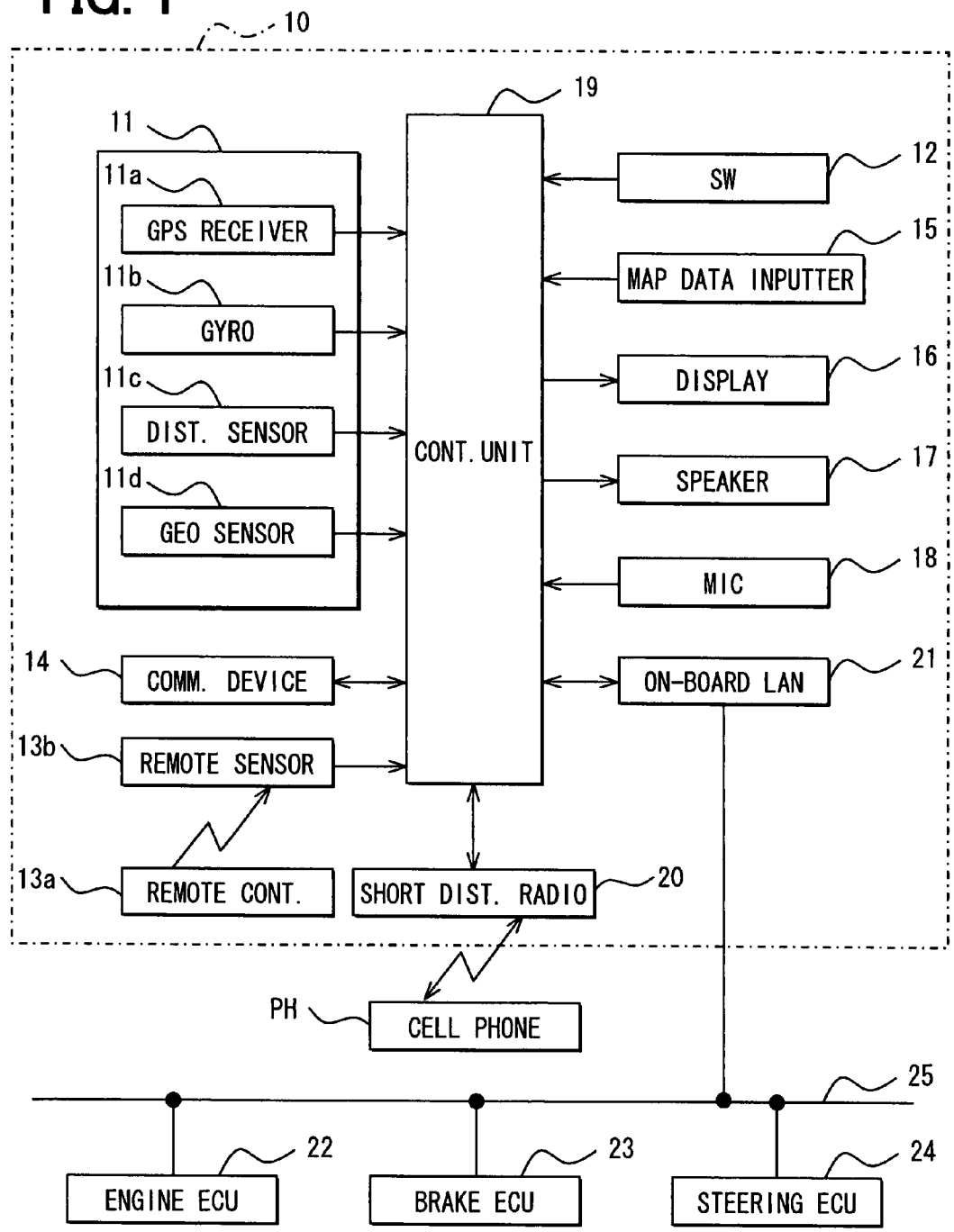
FIG. 1 shows a block diagram of a navigation system and an on-board LAN in an embodiment of the present disclosure.

FIG. 1 is a block diagram showing a configuration of the a navigation system 10 of the present embodiment and a general configuration of an on-board LAN 25 to which the navigation system 10 is connected.

As shown in FIG. 1, the navigation system 10 is installed in a vehicle and connected, via the on-board LAN 25, to various ECUs and on-board devices including an engine ECU 22, a brake ECU 23, and a steering ECU 24.

The engine ECU 22 is configured to control the engine rotation based on a detection signal from an accelerator opening degree sensor which, at least, detects the accelerator opening degree based on the depth to which the accelerator pedal is depressed. The brake ECU 23 is configured, at least, to perform ABS control and traction control based on detection signals from a master cylinder pressure sensor and a vehicle speed sensor. The master cylinder pressure sensor detects the magnitude of braking operation based on the hydraulic pressure of the master cylinder that pressure-feeds brake oil according to the brake pedal operation by a driver. The vehicle speed sensor detects the vehicle speed. The steering ECU 24 is configured, at least, to perform power steering control to generate, based on a detection signal from a steering angle sensor, a force to assist the driver in changing the steering angle of the steering wheel. The steering angle sensor detects the front-wheel steering angle when the driver operates the steering wheel.

Various kinds of vehicle information (e.g. accelerator opening degree, magnitude of braking operation, and vehicle speed) detected by such units as ECU 22 to ECU 24 are transmissible and receivable arbitrarily between such units via the on-board LAN 25.

The navigation system 10 is installed in a vehicle. The navigation system 10 includes a position detector 11 which detects the current position of the vehicle, plural operation switches 12 used to input various instructions given by a user, a remote control terminal (hereinafter referred to as the "remote controller") 13a which, being provided separately from the navigation system 10, can be used, like the plural operation switches 12, to input various instructions, a remote control sensor 13b which receives signals from the remote controller 13a, an outside communication device 14 which connects to a packet communication network to communicate with the outside, a map data inputter 15 which inputs, for example, map data from a map storage medium storing map data and various kinds of other information, a display section 16 for displaying a map and other information, a voice output section 17 for outputting, for example, various voice guidance, a microphone 18 which outputs an electric signal generated based on voice uttered by the user, an on-board LAN communication section 21 which exchanges various vehicle information with other devices via the on-board LAN 25, and a control section 19 which executes various processes according to information inputted from the position detector 11, the plural operation switches 12, the remote control sensor 13b, the map data inputter 15, the microphone 18, a short-distance communication section 20, and the on-board LAN communication section 21 and which controls the display section 16, the voice output section 17, and the on-board LAN communication section 21.

The position detector 11 includes a GPS (Global Positioning System) receiver 11a which receives radio waves from a GPS satellite via a GPS antenna, not shown, and outputs a received radio wave signal, a gyroscope 11b which detects the magnitude of rotary motion applied to the vehicle, a distance sensor 11c which detects the distance traveled by the vehicle based on, for example, the acceleration in the anteroposterior direction of the vehicle, and an earth magnetism sensor 11d which detects the travel direction of the vehicle based on the earth's magnetism. The control section 19 calculates, for example, the vehicle position, orientation, and speed based on the signals outputted from, for example, the sensors 11a to 11d.

There are various ways of determining the current position of the vehicle based on signals outputted from the GPS receiver 11a. Either an independent positioning system or a relative positioning system (e.g. a D-GPS system (Differential-Global Positioning System) or an interferometric positioning system) may be used. It is particularly appropriate to use an RTK-GPS system (Real Time Kinematics Global Positioning System) which is an interferometric positioning system.

The plural operation switches 12 include a touch panel formed integrally with the display surface of the display section 16 and mechanical key switches provided around the display section 16. The touch panel and the display section 16 are integrally laminated. The touch panel may be of any one of a pressure-sensitive type, an electromagnetic induction type, and a capacitance type, or it may be of a type combining any of such types.

The outside communication device 14 is configured to exchange data with a GPS reference base station via an external packet communication network (when an RTK-GPS system is used).

The map data inputter 15 is used to input various data stored in the map storage medium, not shown. The map storage medium stores, for example, map data (for example, node data, link data, cost data, road data, terrain data, mark data, intersection data, and facility data), voice data on objects, and voice recognition data. The map storage medium to store such data may be, for example, a CD-ROM, DVD-ROM, hard disk, or memory card.

The display section 16 includes a color display device which may be a liquid crystal display, an organic electroluminescent display, or a CRT display. The display screen of the display section 16 displays a map image generated based on map data inputted from the map data inputter 15. Additional data such as a mark indicating the current vehicle position detected by the position detector 11, a route leading to a destination, names, landmarks, and various facilities are also displayed overlappingly with the map image.

The voice output section 17 outputs voice guidance for facilities indicated in the map data inputted from the map data inputter 15 and voices/sounds related with other objects indicated in the map data.

The microphone 18 outputs, when a user inputs voice (utterance), an electric signal (voice signal) based on the inputted voice to the control section 19. The navigation system 10 is operable by voice commands inputted via the microphone.

The short-distance communication section 20 communicates with a portable telephone PH possessed by the driver of the vehicle using radio communication technology, for example, RF-ID or Bluetooth (registered trademark). The short-distance communication section 20 acquires, by radio, driver identification information stored in the portable telephone PH for driver identification.

The on-board LAN communication section 21 communicates, via the on-board LAN 25, with various devices (for example, the engine ECU 21) connected to the on-board LAN 25.

The control section 19 is configured centering on a well-known microcomputer including a CPU, a ROM, a RAM, I/O ports, and a bus line which connects such constituent parts. The control section 19 performs various processes based on programs stored in the ROM and RAM.

Figure 2:
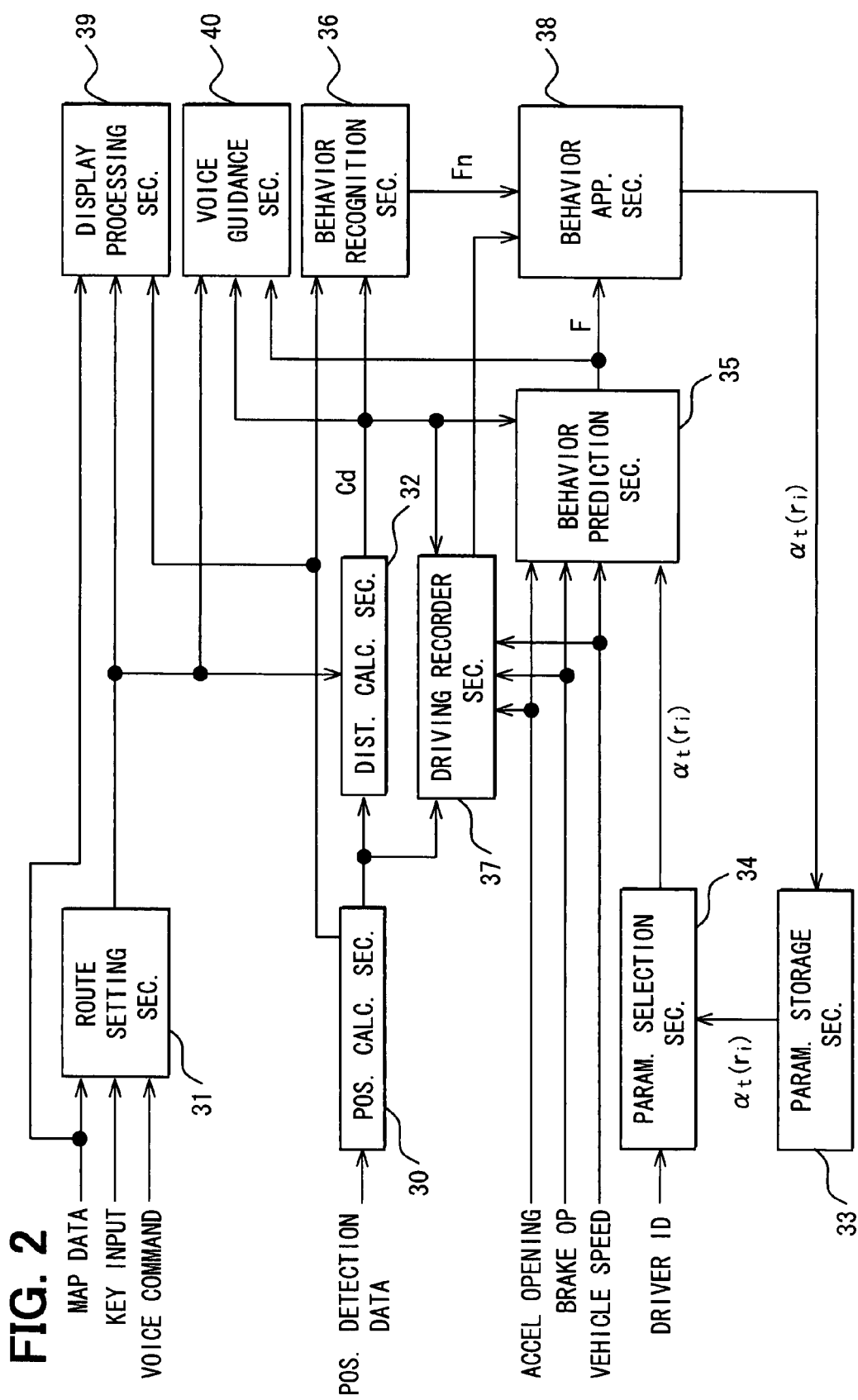
FIG. 2 shows a schematic diagram of processes in a control unit of the navigation system.

FIG. 2 is a functional block diagram outlining processes performed by the control section 19.

As shown in FIG. 2, the control section 19 includes a position calculation section 30, a route setting section 31, a distance calculation section 32, a parameter storage section 33, and a parameter selection section 34. The position calculation section 30 obtains position information which indicates the current position of the vehicle based on position detection data including a detection signal from the position detector 11 and data from the GPS base station obtained via the outside communication device 14. The route setting section 31 sets a destination and an optimum route leading from the current position to the destination, for example, based on map data stored in the map data inputter 15 and in accordance with operations performed using the plural operation switches 12 or the remote controller 13a, or voice commands inputted from the microphone 18. The distance calculation section 32 calculates, based on the position information calculated by the position calculation section 30 and the route set by the route setting section 31, the distance to the nearest object point (an intersection according to the present embodiment) set along the route. The parameter storage section 33 stores, in the RAM included in the control section 19, plural template weighting factors $\alpha_t(r_i)$, being described later, representing drivers' driving tendencies, the plural template weighting factors $\alpha_t(r_i)$ being associated with corresponding driver identifications. The parameter selection section 34 acquires, from the parameter storage section 33, the template weighting factor $\alpha_t(r_i)$ corresponding to the driver identification acquired by the short-distance communication section 20.

The control section 19 also includes a driving behavior prediction section 35 and a driving behavior recognition section 36. The driving behavior prediction section 35 predicts a driver's behavior based on vehicle information which reflects driver's operations represented by information on, for example, the accelerator opening degree, the magnitude of braking operation, and the vehicle speed acquired from the ECUs 22 to 24 via the on-board LAN communication section 21 and the template weighting factor $\alpha_t(r_i)$ selected by the parameter selection section 34. The driving behavior recognition section 36 recognizes, based on the position information on the vehicle positions before and after passing an intersection calculated by the position calculation section 30, the driver's driving behavior practiced at the object point.

The control section 19 further includes a driving recorder section 37. The driving recorder section 37 reads, via the on-board LAN communication section 21, driving data DU(t)={A(t), B(t), V(t)}, in which A(t) represents the accelerator opening, B(t) represents the magnitude of braking operation, and V(t) represents the vehicle speed, and the position information acquired by the position calculation section 30, and stores the driving data DU(t) and the position information in the RAM included in the control section 19.

The control section 19 still further includes a driving behavior application section 38 which updates the template weighting factor $\alpha_t(r_i)$ based on the result of comparison between the result of prediction made by the driving behavior prediction section 35 and the result of recognition made by the driving behavior recognition section 36, thereby learning about the tendency of driver's driving operations.

The control section 19 still further includes a display processing section 39 and a voice guidance execution section 40. The display processing section 39 displays, on the display section 16, a map of an area around the current position read in via the map data inputter 15 based on the position information (current position information) calculated by the position calculation section 30 together with a mark indicating the current position and the route set by the route setting section 31. The voice guidance execution section 40 provides, via the voice output section 17, a voice guidance for an object point indicated in the route information based on the route information provided by the route setting section 31 and in accordance with a prediction result flag F representing the result of prediction made by the driving behavior prediction section 35.

The ROM included in the control section 19 stores behavior pattern templates (hereinafter referred to simply as "templates") to be used in the driving behavior prediction section 35 when predicting a driver behavior.

A procedure for generating the behavior pattern templates will be described with reference to the flowcharts shown in FIGS. 3 and 4 and the explanatory drawing shown in FIG. 5. The behavior pattern templates are generated through processes executed on a computer outside the navigation system 10.

Figure 3:
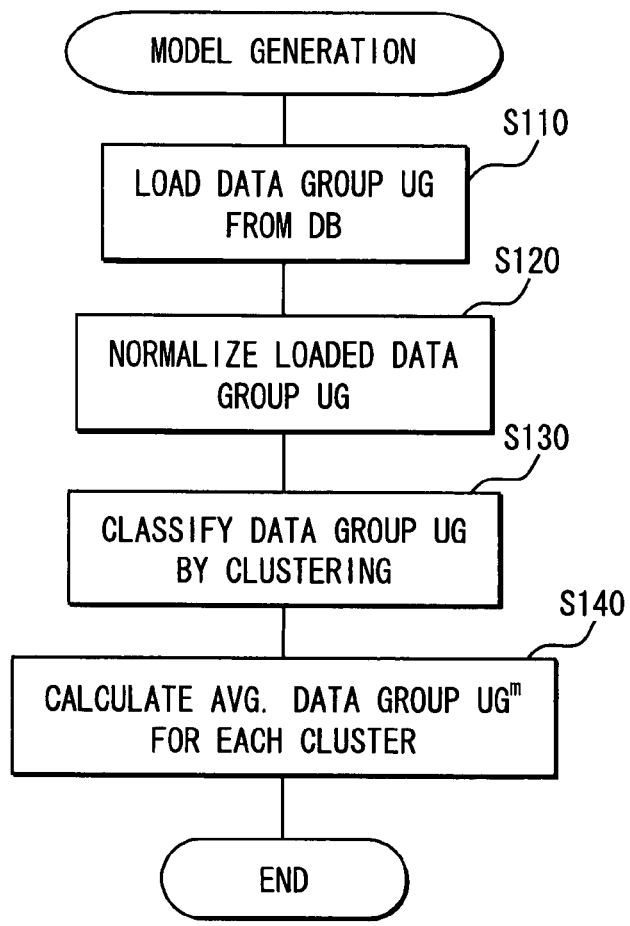
FIG. 3 shows a flowchart of a model generation process.

As shown in FIG. 3, following a start of the behavior model generation procedure, driving data represented by predetermined plural pieces of vehicle information (that is, in the present embodiment, accelerator opening degree A, magnitude of braking operation B, and vehicle speed V) is, in Step S110, loaded from a database where data including various vehicle information sampled at a predetermined sampling interval S is accumulated, the various vehicle information representing the condition of the vehicle.

The driving data accumulated in the database may be data collected through measurements made using a real vehicle or data collected using a driving simulator. Tp/S pieces of driving data collected over a predetermined period Tp before reaching an intersection are referred to as a before-intersection driving data group UG. In Step S110, the before-intersection data group UG collected for every intersection where the vehicle made a right or left turn and for 100 drivers is loaded.

In Step S120, each of the elements A, B, and V included in the driving data loaded in Step S110 is normalized so that the elements A, B, and V each have a value ranging from 0 to 1.

In Step S130, the before-intersection driving data groups UG are classified by a clustering method.

To be concrete, the distances between the before-intersection driving data groups UG are defined and, based on the defined distances, before-intersection driving data groups UG close to one another are classified into a same cluster. This classification can be done using a well-known clustering method, for example, the K-means method.

Figure 5:
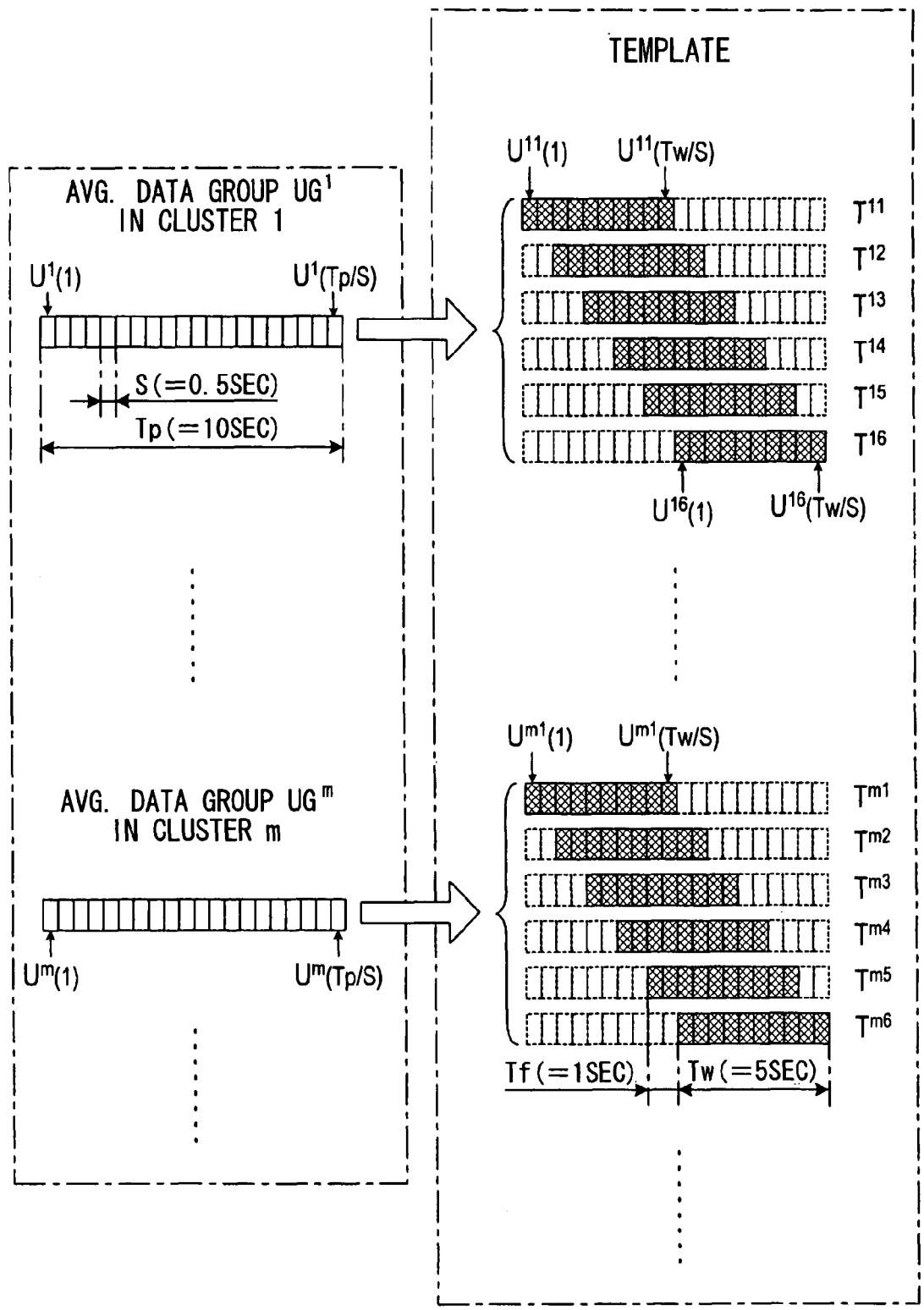
FIG. 5 shows a diagram of a behavior pattern template.

In Step S140, based on the results of classification made in Step S130, an average-data group is generated for each of as many as M clusters by calculating average values of the before-intersection driving data included in each cluster as shown on the left side of FIG. 5 (m=1 to M). The behavior model generation procedure is then terminated.

In the following, an average-data group including average values of the data included in the before-intersection driving data groups UG classified into a cluster m is referred to as the "average-data group $UG^m$." The $UG^m$ is expressed by equation (1). In the equation (1), "$U^m(i)$" represents the i-th average driving data (i=1 to Tp/S) included in the average-data group $UG^m$. The $U^m(i)$ is expressed by equation (2). In equation (2), "$A^m(i)$" represents the average value of the accelerator opening degrees A included in the cluster m. The $A^m(i)$ is determined by extracting the accelerator opening degree A included in the i-th driving data of each of the before-intersection driving data groups UG belonging to the cluster m and calculating the average value of the extracted accelerator opening degrees A. Similarly, "$B^m(i)$" and "$V^m(i)$" respectively represent the average value of the magnitudes of braking operation B and the average value of the vehicle speeds V determined in a manner similar to the above described.

$$UG^m = \{U^m(1), U^m(2), \ldots, U^m(Tp/S)\} \quad (1)$$

$$U^m(i) = \{A^m(i), B^m(i), V^m(i)\} \quad (2)$$

Figure 4:
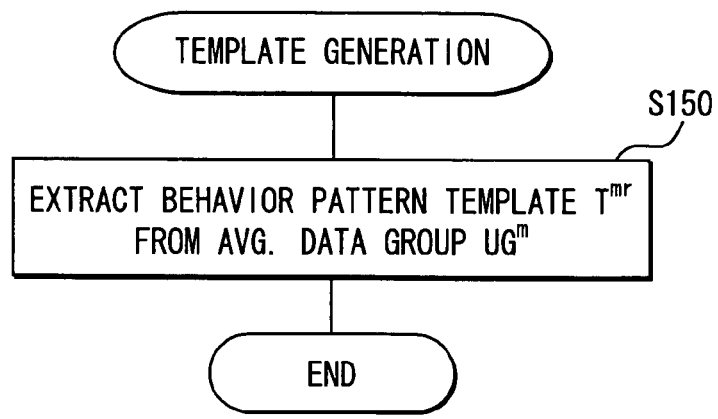
FIG. 4 shows a flowchart of a template generation process.

Subsequently, following a start of the template generation procedure, in Step S150 as shown in FIG. 4, Tw/S consecutive pieces of average driving data $U^m(i)$ are extracted, from each of as many as M average-data groups $UG^m$ generated in the behavior model generation procedure, repeatedly while the Tw/S consecutive pieces of data to be extracted are shifted by Tf/S pieces for every extraction. In this way, as many as R groups (R=(Tp−Tw)/Tf+1) of average driving data $U^m(i)$ for use as behavior pattern templates $T^{mr}$ (r=1 to R) are collected. The template generation procedure is then terminated.

The behavior pattern template $T^{mr}$ is expressed by equation (3). In equation (3), "$U^{mr}(j)$" represents the average operating data defined by equation (4), j being a value ranging from 1 to Tw/S. The $U^{mr}(j)$ is expressed by equation (5). In equation (5), $A^{mr}(j)$, $B^{mr}(j)$, and $V^{mr}(j)$ respectively represent an average accelerator opening degree, average magnitude of braking operation, and average vehicle speed defined similarly to equation (4).

$$T^{mr} = \{U^{mr}(1), U^{mr}(2), \ldots, U^{mr}(Tw/S)\} \quad (3)$$

$$U^{mr}(j) = U^m(j+(r-1)\times Tf/S) \quad (4)$$

$$U^{mr}(j) = \{A^{mr}(j), B^{mr}(j), V^{mr}(j)\} \quad (5)$$

Namely, for each cluster m, as many as R behavior pattern templates $T^{mr}$ are generated, totaling M times R templates for M clusters.

In the present embodiment: S=0.5 s, Tp=10 s, Tw=5 s, Tf=1 s, Tp/S=20, Tw/S=10, Tf/S=2, and R=6. The number of clusters M is about 5 to 7 depending on the result of processing in Step S130. The number of behavior pattern templates $T^{mr}$, therefore, ranges about 30 to 40.

The navigation process executed by the control section 19 of the navigation system 10 will be described below.

The processes performed by the position calculation section 30, the route setting section 31, the distance calculation section 32, the driving recorder section 37, and the display processing section 39 are well-known processes, so that they will not be described in the following. The processes performed by the parameter selection section 34, the driving behavior prediction section 35, the driving behavior recognition section 36, and the driving behavior application section 38 that concern an essential part of the present invention will be described with reference to the flowcharts shown in FIGS. 6, 7, and 9.

Figure 6:
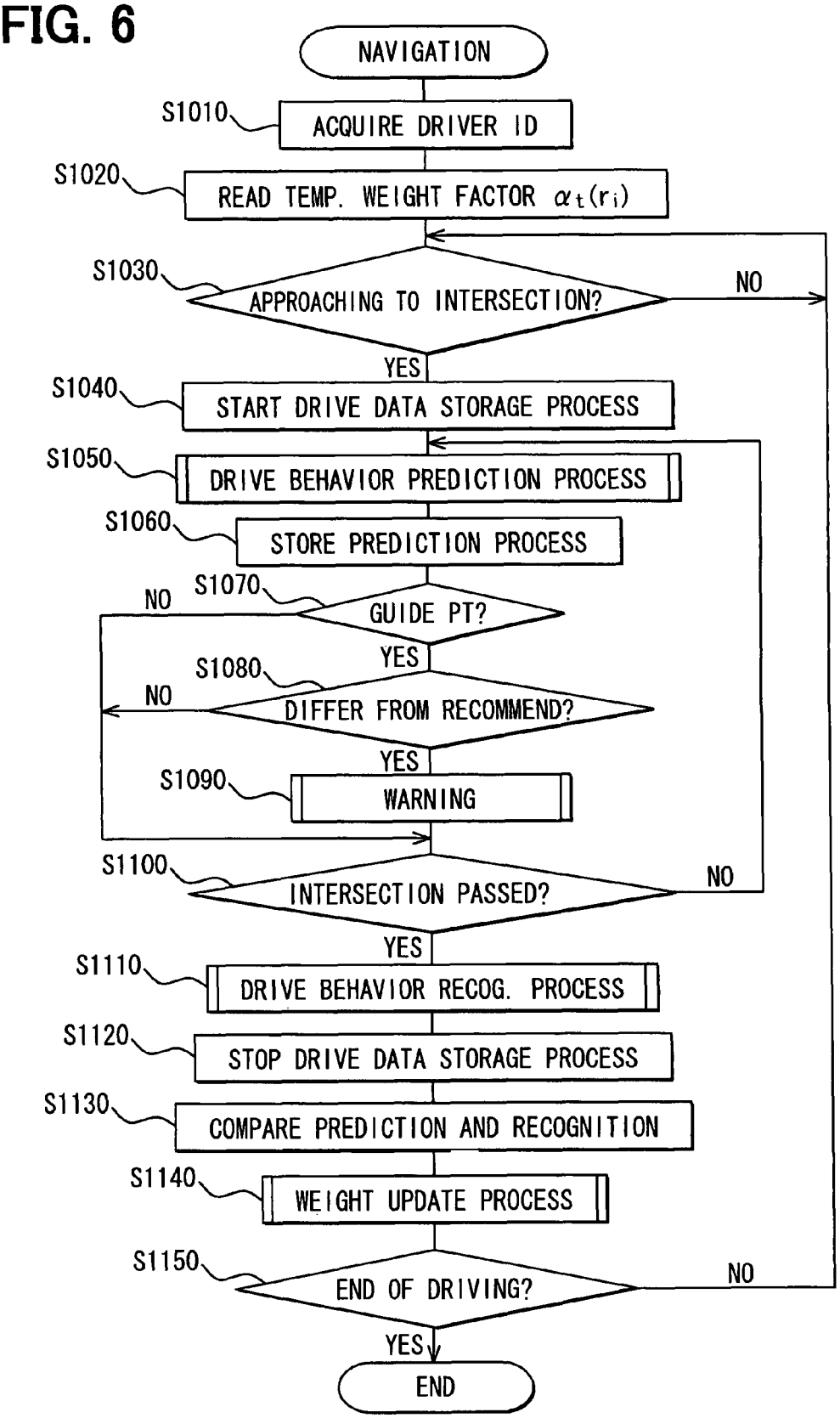
FIG. 6 shows a flowchart of a navigation process.

The process shown in FIG. 6 is executed in cases where a route leading to a destination has been set by the route setting section 31.

Following a start of the navigation process, the short-distance communication section 20 acquires driver identification information in Step S1010.

In Step S1020, the parameter selection section 34 reads the template weighting factor $\alpha_t(r_i)$ corresponding to the driver identification information acquired in Step S1010. The template weighting factor $\alpha_t(r_i)$ represents the reliability of the template $r_i$ (i represents a template number) at discrete time t, so that it can be used as an indicator of a tendency of the driver's driving operation. In cases where no template weighting factor $\alpha_t(r_i)$ corresponding to the driver identified in Step S1010 is stored in the parameter storage section 33, the average value of the plural template weighting factors $\alpha_t(r_i)$ stored in the parameter storage section 33 is stored, being associated with the driver identified in Step S1010, in the parameter storage section 33 as an initial value of the template weighting factor $\alpha_t(r_i)$ corresponding to the driver.

In Step S1030, the distance Cd to an intersection (hereinafter referred to as the "object intersection") is acquired from the distance calculation section 32, and whether the distance Cd is either equal to or smaller than a predetermined distance (300 m in the present embodiment) for starting checking is determined. When the distance Cd is greater than the predetermined distance, Step S1030 is repeated, that is, the process does not advance to Step S1040. When the distance Cd is not greater than the predetermined distance, the vehicle is determined to have adequately approached the object intersection and the process advances to Step S1040.

In Step S1040, the driving recorder section 37 starts the driving behavior data storage process. In Step S1050, the driving behavior prediction section 35 performs the driving behavior prediction process. In Step S1060, the result of the driving behavior prediction process is stored in the RAM of the control section 19.

In Step S1070, whether the object intersection is a guide point covered by the navigation system 10 is determined. When it is determined that the object intersection is not a guide point, the process skips to Step S1100. When it is determined that the object intersection is a guide point, the process advances to Step S1080. In Step S1080, whether the behavior recommended by the navigation system 10 (hereinafter referred to as the "system-recommended behavior") differs from the prediction result obtained in Step S1060 is determined.

When the system-recommended behavior does not differ from the prediction result, the process advances to Step S1100. When the system-recommended behavior differs from the prediction result, the process advances to Step S1090.

In Step S1090, the voice guidance execution section 40 executes warning. In Step S1100, the distance Cd to the object intersection is acquired from the distance calculation section 32 and, based on the distance Cd, whether the object intersection has been passed is determined. When it is determined that the object intersection has not been passed, the process returns to Step S1050 to repeat Steps S1050 to S1090 again. When it is determined that the object intersection has been passed, the process advances to Step S1110.

In Step S1110, the driving behavior recognition section 36 executes the driving behavior recognition process.

In Step S1120, the driving behavior data storage process started in Step S1040 is terminated. Namely, driving data DUm(t) collected over the distance Cd to the object intersection is stored in the RAM of the control section 19 by the driving recorder section 37.

In Step S1130, the prediction result stored in Step S1060 and the recognition result acquired in the driving behavior recognition process executed in Step S1110 are compared, and the process then advances to Step S1140.

In Step S1140, the driving behavior application section 38 executes the weight update process. In Step S1150, whether driving of the vehicle ended is determined. When it is determined that the driving has not ended, the process returns to Step S1030 to repeat Steps S1030 to S1140 again. When it is determined that the driving has ended, the navigation process is terminated.

Figure 7:
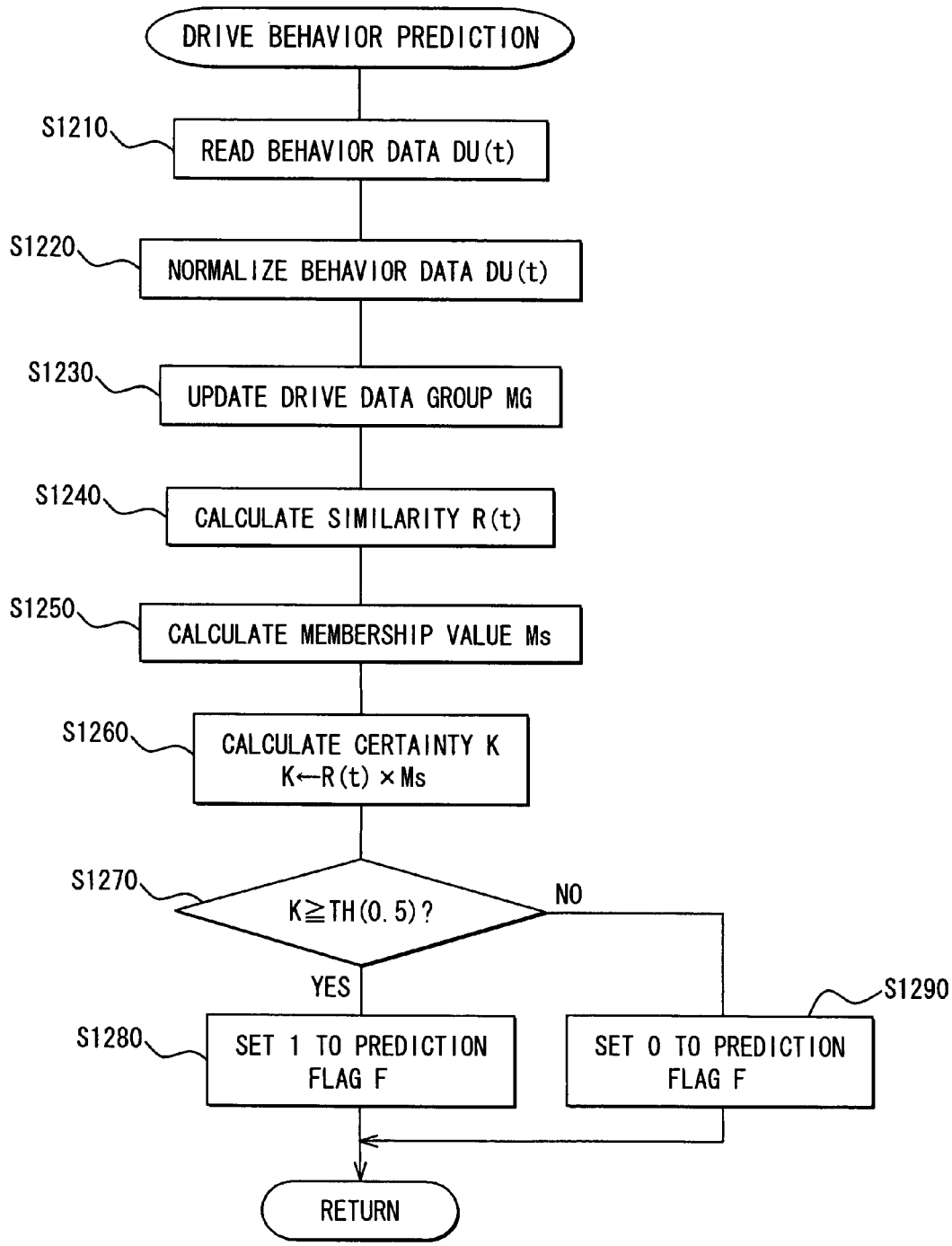
FIG. 7 shows a flowchart of a driving behavior prediction process.

The driving behavior prediction process executed in Step S1050 will be described in detail below with reference to the flowchart shown in FIG. 7.

Following a start of the driving behavior prediction process, in Step S1210, driving data DU(t)={A(t), B(t), V(t)} is read via the on-board LAN communication section 21, the driving data including such elements as the accelerator opening A(t), the magnitude of braking operation B(t), and the vehicle speed V(t).

In Step S1220, each of the elements A(t), B(t), and V(t) included in the driving data DU(t) read in Step S1210 is normalized so that the elements A(t), B(t), and V(t) each have a value ranging from 0 to 1.

In the above, "t" represents the time when the data is sampled. The driving data DU(t) is read at the foregoing sampling interval S (=0.5 s).

In Step S1230, the data stored in the RAM is updated so that the driving data DU(t), DU(t−S), ..., DU(t−Tw) sampled over the past period of Tw (=5 s), including the normalized driving data DU(t), is stored in the RAM of the control section 19. In the following, the driving data sampled over the period of Tw seconds (i.e. Tw/S pieces) and stored in the RAM will be referred to as the driving data group MG. The driving data group MG is expressed by equation (6). The driving data MU(j) included in the driving data group MG is expressed by equation (7). In equation (7): j=1 to Tw/S, so that J=1 for the oldest data and J=Tw/S for the last data. Namely: DU(t−Tw)=MU(1), ..., DU(t)=MU(Tw/S).

$$MG = \{MU(1), MU(2), \ldots, MU(Tw/S)\} \quad (6)$$

$$MU(j) = \{A(j), B(j), V(j)\} \quad (7)$$

In Step S1240, the similarity at time t, R(t), is calculated based on the driving data group MG and the behavior pattern templates $T^{mr}$ stored in the ROM of the control section 19, and the calculated similarity R(t) is stored in the RAM of the control section 19.

To be concrete, first, index data $R^{mr}$ which represents the distance to the driving data group MG is calculated based on equation (8) for each of the behavior pattern templates $T^{mr}$.

$$R^{mr} = \frac{\sum_{j=1}^{Tw/S} a_t(r_j) \sqrt{\begin{array}{l}\{A(j) - A^{mr}(j)\}^2 + \\ \{B(j) - B^{mr}(j)\}^2 + \\ \{V(j) - V^{mr}(j)\}^2\end{array}}}{Tw/S} \quad (8)$$

Of the index data $R^{mr}$ calculated for each of the behavior pattern templates $T^{mr}$, the one with the smallest value (i.e. the one representing the distance to the behavior pattern template most similar to the driving data group MG) is extracted as the representative index data at time t, RE(t) (see equation (9)). At the same time, of the past representative index data calculated as described above, the one with the largest value is extracted as a reference index data RK(t) (see equation (10)). Furthermore, the representative index data RE(t) is normalized using the reference index data RK(t) (see equation (11)). The normalized representative index data RE(t) is used as the similarity R(t).

$$RE(t) = \min\{R^{11}, R^{12}, \ldots, R^{1R}, R^{21}, \ldots, R^{MR}\} \quad (9)$$

$$RK(t) = \max\{\ldots, RE(t-2S), RE(t-S), RE(t)\} \quad (10)$$

$$R(t) = \frac{RK(t) - RE(t)}{RK(t)} \quad (11)$$

Figure 8:
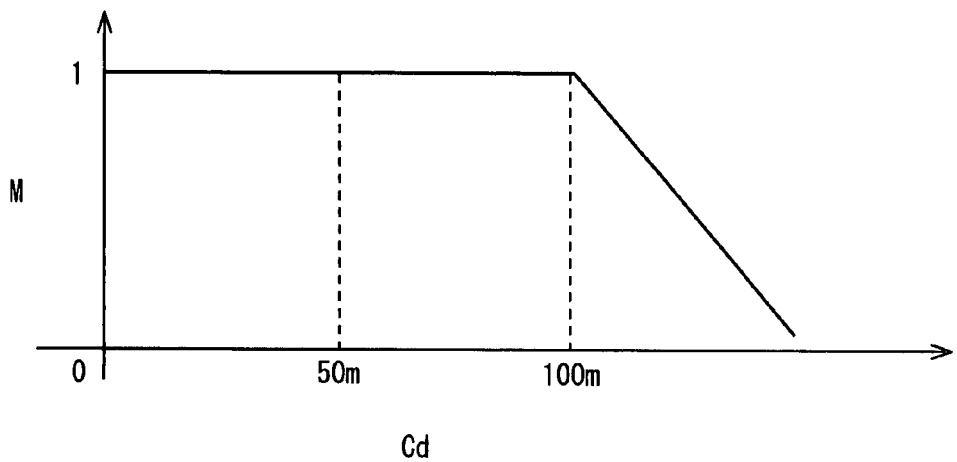
FIG. 8 shows a diagram of membership values for calculating reliability.

In Step S1250, a membership value Ms is obtained using a membership function. As shown in FIG. 8, the membership function outputs 1 when the distance Cd to the intersection acquired from the distance calculation section 32 is not greater than a predetermined distance (100 m in the present embodiment). When the distance Cd is greater than the predetermined distance, the membership function outputs a value smaller than 1, the value being smaller when the distance Cd is greater.

In Step S1260, a certainty factor K(=R(t)×Ms) is calculated by multiplying the membership value Ms by the similarity R(t) obtained in Step S1240.

In Step S1270, whether the certainty factor K calculated in Step S1260 is either equal to or larger than a predetermined threshold value TH (0.5 in the present embodiment) is determined.

When, in Step S1270, the certainty factor K is determined to be either equal to or larger than the threshold value TH, the process advances to Step S1280. In Step S1280, a prediction result flag F is set to 1 with the driver predicted to turn at the intersection. The driving behavior prediction process is then terminated.

When, in Step S1270, the certainty factor K is determined to be smaller than the threshold value TH, the process advances to Step S1290. In Step S1290, the prediction result flag F is set to 0 with the driver predicted not to turn at the intersection. The driving behavior prediction process is then terminated.

Figure 9:
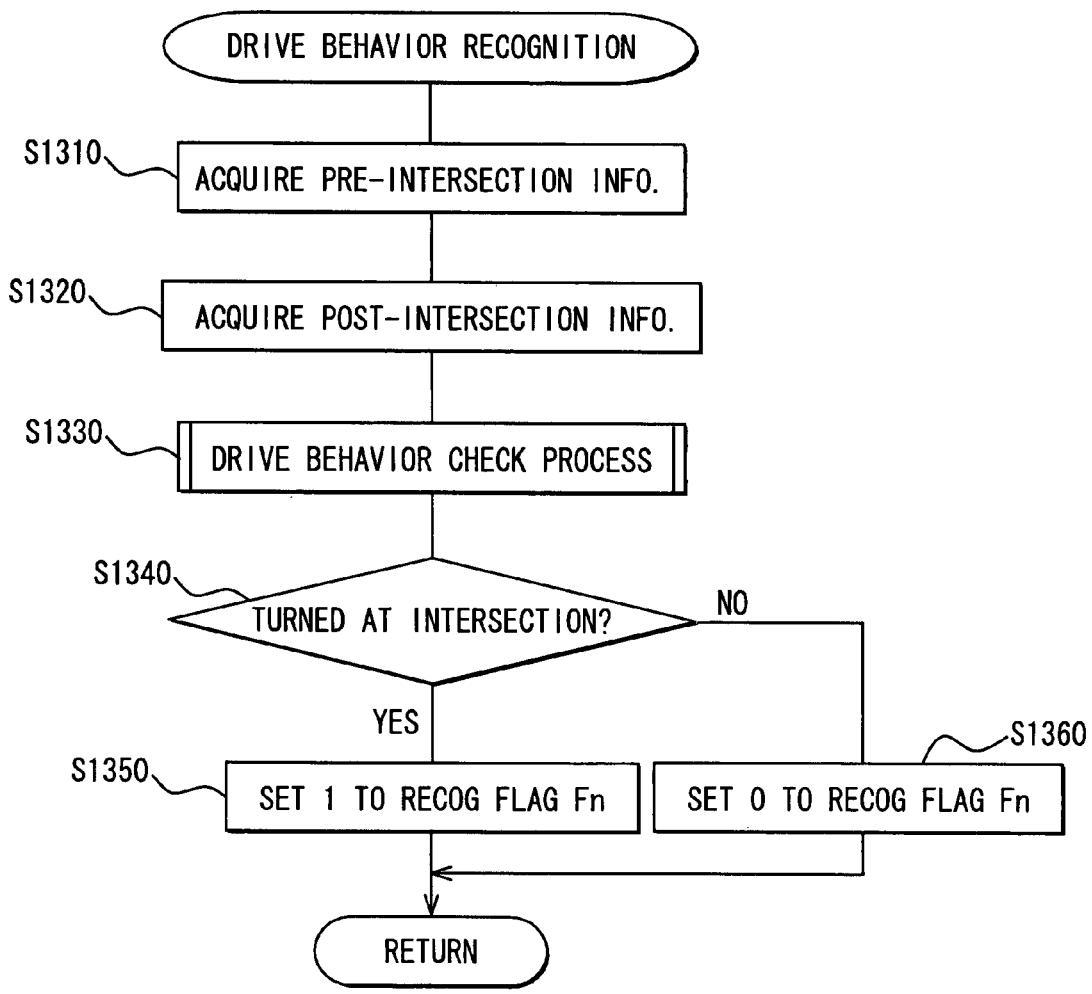
FIG. 9 shows a flowchart of a driving behavior recognition process.

The driving behavior recognition process executed in Step S1110 of the navigation process (FIG. 6) will be described in detail below with reference to the flowchart shown in FIG. 9.

Following a start of the driving behavior recognition process, information on the position of the vehicle before passing the object intersection (for example, the vehicle position information collected two seconds before passing the object intersection) is acquired in Step S1310 from the history of the vehicle position information collected over the distance Cd to the object intersection and stored by the driving recorder section 37.

In Step S1320, the position calculation section 30 acquires the position information on the vehicle having passed the object intersection (for example, the vehicle position information collected two seconds after passing the object intersection).

In Step S1330, a driving behavior checking process is performed, to recognize how the driver behaved when passing the object intersection, based on the vehicle position information acquired, in Step S1310, before passing the object intersection and the vehicle position information acquired, in Step S1320, after passing the object intersection. The driving behavior checking process may determine that the vehicle turned at an intersection in cases where, according to the vehicle position information acquired before and after an intersection is passed, the vehicle position after passing the intersection is outside the road width (10 m) along the route that the vehicle was following until reaching the intersection.

In Step S1340, it is determined whether, in the driving behavior checking process in Step S1330, the vehicle was recognized to have turned at the intersection.

When, in Step 1340, it is determined that the vehicle was recognized to have turned at the intersection, the process advances to Step S1350 where the recognition result flag Fn is set to 1. The driving behavior recognition process is then terminated.

When, in Step 1340, it is determined that the vehicle was not recognized to have turned at the intersection (recognized to have run straight through the intersection), the process advances to Step S1360 where the recognition result flag Fn is set to 0. The driving behavior recognition process is then terminated.

Figure 10:
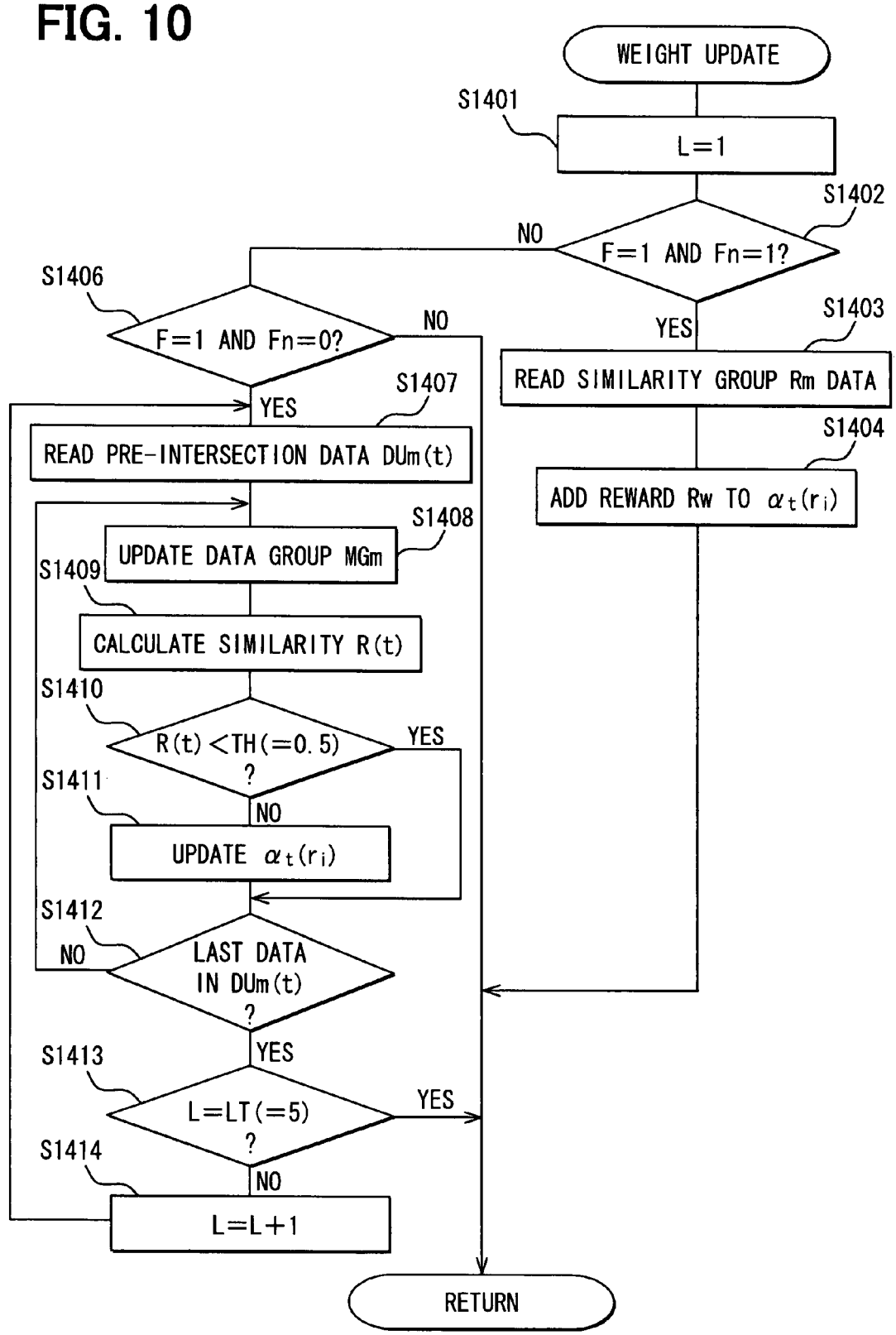
FIG. 10 shows a flowchart of a weighting factor update process.

The weight update process executed in Step S1140 of the navigation process (FIG. 6) will be described in detail below with reference to the flowchart shown in FIG. 10.

Following a start of the weight update process, a counter L to count the number of times of learning made with regard to the tendency of the driver's driving operation is initialized (L=1) in Step S1401.

In Step S1402, it is determined whether the prediction result flag F and the recognition result flag Fn have both been set to 1. Namely, it is determined whether the vehicle, after being predicted to turn (F=1) in the driving behavior prediction process, was recognized to have turned (Fn=1) in the driving behavior recognition process.

When, in Step S1402, it is determined that the flags F and Fn have both been set to 1 (F=1 and Fn=1), the process advances to Step S1403. In Step S1403, a similarity group Rm collected over a period of time until the object intersection is reached and stored in the RAM of the control section 19 (that is, in the present embodiment, data collected over a period of 7 seconds) is acquired.

In Step S1404, by assigning a reward Rw to the template weighting factor $\alpha_t(r_i)$ for each of the relevant templates corresponding to the similarity group Rm, the template weighting factor $\alpha_t(r_i)$ is updated. In doing this, the end of the similarity group Rm (including the IDs of templates used in similarity calculations), i.e. the time when the object intersection has been reached is used as a base point.

To be concrete, first, an evaluation function $evl(r_i, t)$ is obtained (equations (12) and (13)), the evaluation function being for delivering the reward Rw to the template applied at the base point, i.e. at the time when the intersection has been reached, and assigning the reward Rw to the templates having predicted over a preceding period (a 7-second period preceding the base point) that the vehicle would turn at the intersection.

In equations (12) and (13), "$GR(r_i, n_t)$" represents the reward value obtained by the template $r_i$ prior to the sampling at $n_t$. The $n_t$ is a time series index for samplings made before the intersection is reached. "$n_t=0$" represents the time when the intersection has been reached. A larger value of $n_t$ represents a time more preceding the time when the intersection has been reached.

As shown in equation (13), $GR(r_i, n_t)$ returns a reward represented by a geometric series which is expressed by the reward Rw as the first term, a value γ greater than 1 as a common ratio, and $n_t$ as a variable to templates $r_i$ having predicted that the vehicle would turn at the intersection. The reward returned to templates $r_i$ not having predicted that the vehicle would turn at the intersection is 0. Namely, the reward is assigned such that the templates $r_i$ having made a correct prediction earlier are given larger values of reward.

As shown in equation (12), the evaluation function $evl(r_i, t)$ is obtained by summing up the rewards assigned to the templates $r_i$ and dividing the sum of the rewards by the number of times $N(r_i)$ the templates $r_i$ are used for driving behavior prediction.

Based on the evaluation function $evl(r_i, t)$, $W_t(r_i)$ which, being a parameter of the template weighting factor $α_t(r_i)$, represents the strength of each template is updated. For example, $W_t(r_i)$ can be updated to $W_{t+1}(r_i)$ by, as equation (14) shows, subtracting $evl(r_i, t)$ from $W_t(r_i)$. The strength $W(r_i)$ is converted to the template weighting factor $α_t(r_i)$ by, as equation (15) shows, normalization made using a soft-max function. The soft-max function is a normalization function. It balances the driving pattern templates as a whole. In equation (15), β represents a positive constant. When β is 0, all $α_t(r_i)$ values are equal. When β is ∞, the maximum $α_t(r_i)$ value approaches 1. Subsequently, the weight update process is terminated.

$$evl(r_i, t) = \frac{\sum_{n_t=0}^{N_t} GR(r_i, n_t)}{N(r_i)} \quad (12)$$

$$GR(r_i, n_t) = \begin{cases} γ^{n_t} R_w & [(R(n_t) > TH) \cap (r_i \text{ is used})] \\ 0 & [\text{Others}] \end{cases} \quad (13)$$

$$w_{t+1}(r_i) \leftarrow w_t(r_i) - evl(r_i, t) \quad (14)$$

$$a_t(r_i) = e^{βw_t(r_i)} / \sum_j^N e^{βw_i(r_j)} \quad (15)$$

When, in Step S1402, it is determined that at least one of the flags F and Fn has not been set to 1, the process advances to Step S1406. In Step S1406, it is determined whether the prediction result flag F has been set to 1 whereas the recognition result flag Fn has been set to 0. Namely, it is determined whether the vehicle was recognized to have run straight through the intersection (Fn=0) even though the vehicle was predicted, in the driving behavior prediction process, to turn at the intersection (F=1).

When, in Step S1406, it is determined that the prediction result flag F has been set to 1 whereas the recognition result flag Fn has been set to 0, the process advances to Step S1407. In Step S1407, the driving behavior data DUm(t) collected over a distance to the object intersection and stored in the RAM of the control section 19 by the driving recorder section 37 is acquired and, as done in Step S1220 (FIG. 7), each element of the driving behavior data DUm(t) is normalized.

In Step S1408, as in Step S1230, a driving data group MGm is obtained by calculation based on the driving data collected over a period of the last Tw (5 seconds), the driving data including the driving behavior data DUm(t) normalized in Step S1407, and the driving data group MGm thus obtained is stored in the RAM of the control section 19 to update the existing data.

In Step S1409, as in Step S1240 (FIG. 7), the similarity at time t, R(t), is calculated again based on the driving data group MGm updated in Step S1408 and the behavior pattern template $T^{mr}$.

In Step S1410, whether the similarity R(t) is smaller than the threshold value TH (0.5) is determined.

When, in Step S1410, the similarity R(t) is determined to be smaller than the threshold value TH, the process advances to Step S1412. Namely, the template weighting factor $α_t(r_i)$ at time t is recognized to be appropriate.

When, in Step S1410, the similarity R(t) is determined to be equal to or larger than the threshold value TH, the process advances to Step S1411 where the template weighting factor $α_t(r_i)$ is updated. To update the template weighting factor $α_t(r_i)$, the difference between the similarity R(t) calculated in Step S1409 and the threshold value TH (0.5 in the present embodiment) is obtained, and a cumulative value of the difference is normalized and set as an updated template weighting factor $α_t(r_i)$ (see equations (16) to (18)).

$$evl(r_i, t) = |R(t) - TH| \quad (16)$$

$$w_{t+1}(r_i) \leftarrow w_t(r_i) + evl(r_i, t) \quad (17)$$

$$a_t(r_i) = e^{βw_t(r_i)} / \sum_j^N e^{βw_i(r_j)} \quad (18)$$

To be concrete, first, an evaluation function $evl(r_i, t)$ which represents the difference between the similarity R(t) and the threshold value TH is obtained (equation (16)).

Based on the evaluation function $evl(r_i, t)$, $W_t(r_i)$ which, being a parameter of the template weighting factor $α_t(r_i)$, represents the strength of each template is updated. For example, the amount by which to update $W_t(r_i)$ to $W_{t+1}(r_i)$ can be obtained by, as equation (17) shows, adding $evl(r_i, t)$ to $W_t(r_i)$. Thus, $W_t(r_i)$ is represented by a cumulative value of the difference between the similarity R(t) and the threshold value TH. The strength $W(r_i)$ is converted to the template weighting factor $α_t(r_i)$ by, as equation (18) shows, normalization made using a soft-max function. Subsequently, the process advances to Step S1412.

In Step S1412, whether the driving behavior data DUm(t) used in Step S1407 is the one collected when the object intersection was passed (that is, the last stored driving data out of the series of the driving data DUm(t) stored by the driving recorder section 37 until when the object intersection was reached) is determined.

When, in Step S1412, it is determined that the driving behavior data DUm(t) is not the one collected when the object intersection was passed, the process returns to Step S1408 to work on the next driving data DUm(t). Namely, Steps S1408 through S1411 are repeated for the driving behavior data DUm(t) collected before the object intersection has been passed.

When, in Step S1412, it is determined that the driving behavior data DUm(t) is the one collected when the object intersection was passed, the process advances to Step S1413.

In Step S1413, whether the counter L has reached the number of times of learning LT (=5) is determined.

When, in Step S1413, it is determined that the counter L has not reached the number of times of learning LT, the process advances to Step S1414. In Step S1414, the counter L is incremented by 1 (L=L+1) and the process returns to Step S1407.

When, in Step S1413, it is determined that the counter L has reached the number of times of learning LT (meaning that the template weighting factor $\alpha_t (r_i)$ has been updated five times), the weight update process is terminated.

Figure 11:
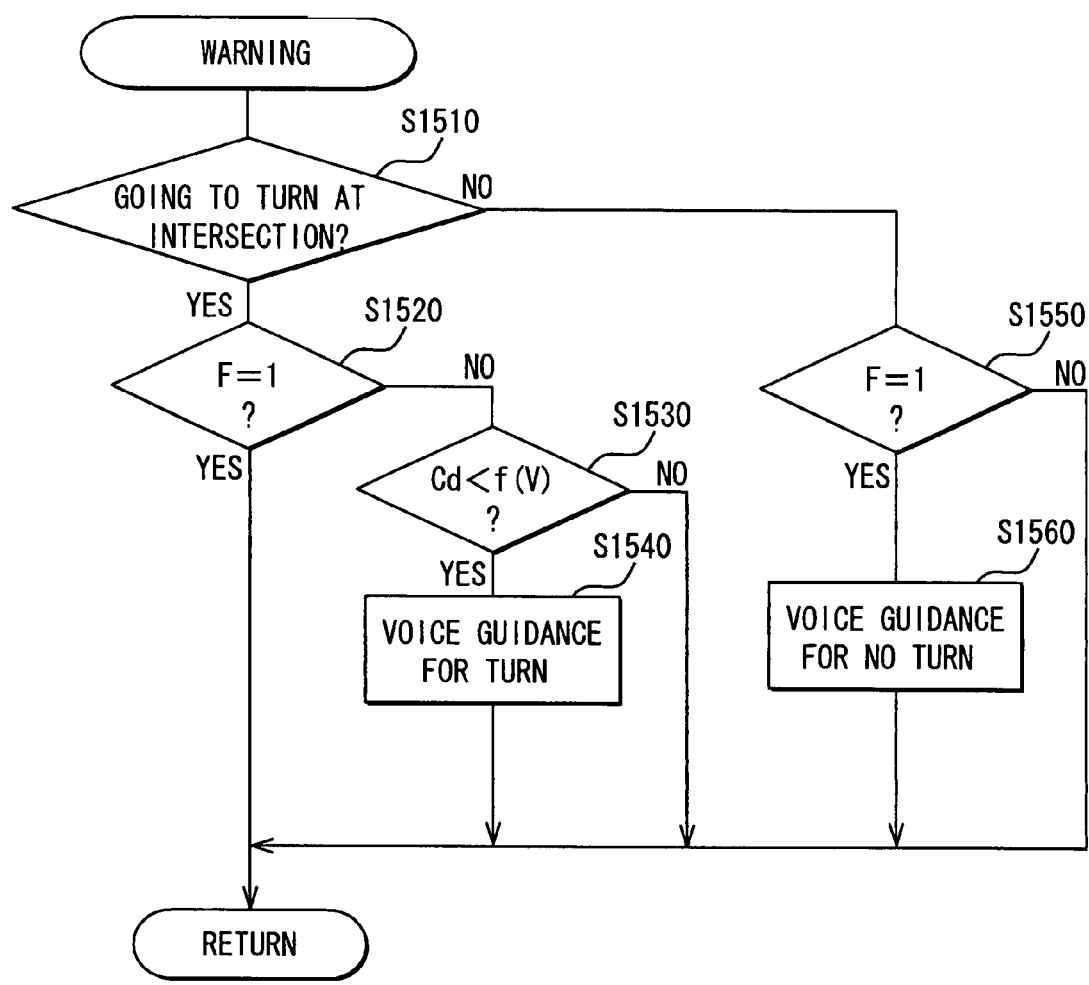
FIG. 11 shows a flowchart of a warning process.

The warning process executed in Step S1090 included in the navigation process (FIG. 6) will be described below with reference to the flowchart shown in FIG. 11.

Following a start of the warning process, whether to turn at an object intersection is determined in Step S1510 based on the route set by the route setting section 31.

When, in Step S1510, it is determined that the vehicle should turn at the object intersection, the process advances to Step S1520. In Step S1520, whether the prediction result flag F has been set to 1, that is, whether the driver is going to turn at the object intersection is determined.

When, in Step S1520, it is determined that the prediction result flag F has been set to 1, the warning process is terminated.

When, in Step. S1520, it is determined that the prediction result flag F has not been set to 1, the process advances to Step S1530. In Step S1530, it is determined whether the distance Cd to the intersection is smaller than the required distance Dneed =f(V) calculated based on an input of the vehicle speed V normalized in Step S1220 and using a function f(V).

Figure 12:
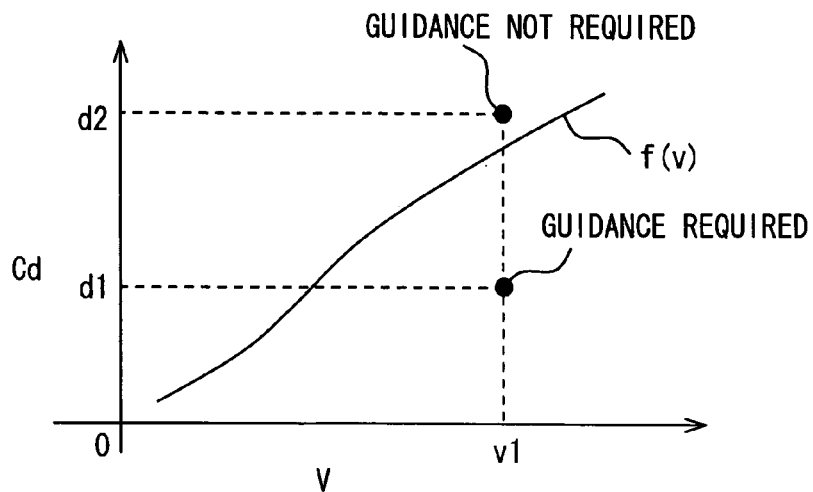
FIG. 12 shows a diagram of voice guidance provision conditions.

The function f(V) is set such that, as shown in FIG. 12, the required distance Dneed is greater when the vehicle speed V is higher and also such that the first voice guidance is provided well in advance to allow the driver to easily follow the guidance.

When, in Step S1530, it is determined that the distance Cd to the intersection is smaller than the required distance Dneed (see d1 in FIG. 12), the process advances to Step S1540. In Step S1540, a voice guidance to urge the driver to turn at the object intersection (or to urge the driver not to drive straight through the object intersection) is provided. Subsequently, the warning process is terminated. When, in Step S1530, it is determined that the distance Cd to the intersection is not smaller than the required distance Dneed (see d2 in FIG. 12), providing the voice guidance is regarded premature and the warning process is terminated without providing the voice guidance.

When, in Step S1510, it is determined that the vehicle should not turn at the object intersection, the process advances to Step S1550. In Step S1550, whether the prediction result flag F has been set to 1, that is, whether the driver is going to turn at the object intersection is determined.

When, in Step S1550, it is determined that the prediction result flag F has been set to 1, the process advances to Step S1560. In Step S1560, a voice guidance to urge the driver not to turn at the object intersection (or to urge the driver to drive straight through the object intersection) is provided. Subsequently, the warning process is terminated. When, in Step S1550, it is determined that the prediction result flag F has not been set to 1, the warning process is terminated without providing the voice guidance.

In the navigation system 10 configured as described above: the position calculation section 30 calculates position information which indicates the current position of the vehicle; the route setting section 31 sets an optimum route leading from the current position to a destination; and the distance calculation section 32 calculates, based on the position information calculated by the position detector 11 and the route set by the route setting section 31, the distance to the nearest one of the object points set along the route.

The driving data DU(t)={A(t), B(t), V(t)} having such elements as the accelerator opening A(t), the magnitude of braking operation B(t), and the vehicle speed V(t) is read via the on-board LAN communication section 21. The templates are stored in the ROM of the control section 19, and the template weighting factors $\alpha_t(r_i)$ are stored in the RAM of the control section 19. When the distance to the object point does not exceed the distance (300 m in the present embodiment) for starting checking (Step S1030), the driving behavior prediction section 35 predicts how the driver will behave at the object point based on the driving data DU(t), template $T^{mr}$, and template weighting factor $\alpha_t (r_i)$ (Step S1050).

Furthermore, the driving behavior recognition section 36 recognizes the driving behavior actually practiced by the driver at the object point (Step Si 110). The result of the prediction made by the driving behavior prediction section 35 and the result recognized by the driving behavior recognition section 36 are compared (Step S1130). When the results compared agree, the template weighting factor $\alpha_t (r_i)$ for the template used to make the prediction that agreed with the recognition is updated by the driving behavior application section 38 to increase the reliability of the template in predicting the driving behavior (Steps S1140 and S1404).

Namely, to learn the driver's driving tendency, the template weighting factor $\alpha_t (r_i)$ is updated such that the results of prediction and recognition agree.

Thus, the prediction accuracy of the driving behavior prediction process (Step S1050) can be improved by learning the driver's driving behavior and reflecting the result of learning on the prediction.

In the driving behavior prediction process (Step S1050), the template weighting factor $\alpha_t (r_i)$ is updated such that the reliability of the template is increased more in cases where the object point was farther away when the driving behavior was predicted (Step S1404). Thus, the reliability of templates which enable correct prediction to be made more in advance of the vehicle reaching the object point can be increased more. This improves the prediction accuracy in making an early prediction of the driving behavior of a driver at an object point, so that the driving behavior can be predicted earlier.

The template weighting factor $\alpha_t (r_i)$ is updated every time the vehicle passes an object point (Steps S1100 and S1140), so that the result of learning at an object point can be reflected on the prediction made at the next object point.

The result of prediction made by the driving behavior prediction section 35 and the result of the corresponding recognition made by the driving behavior recognition section 36 are compared (Step S1130) and, when they do not agree, the driving behavior application section 38 updates the template weighting factor $\alpha_t (r_i)$ for the template used to make the prediction to decrease the reliability of the template in predicting the driving behavior (Steps S1140 and S1411). Thus, to learn the driving behavior of the driver, the template weighting factor $\alpha_t (r_i)$ is updated whether the result of a prediction and the result of the corresponding recognition agree or not. This further improves the prediction accuracy.

When there is a template with a similarity R(t) and a membership value Ms, the product of which (certainty factor K) exceeds a threshold value TH, it is predicted that the driving behavior of the driver at the corresponding object point will be as indicated by the template (Step S1270) and the template weighting factor $\alpha_t(r_i)$ is updated based on the difference between the similarity R(t) and the threshold value TH (Step S1411). In this way, whether the driving data DU(t) is similar to the template $T^{mr}$ can be quantitatively determined, so that stable prediction can be made. This also makes it possible to vary the template weighting factor $\alpha_t(r_i)$ according to the difference between the threshold value TH and the similarity R(t). The template weighting factor $\alpha_t(r_i)$ can therefore be updated efficiently in a direction toward making the results of prediction and recognition agree.

The short-distance communication section 20 acquires driver identification information (Step S1010) and the template weighting factor $\alpha_t(r_i)$ corresponding to the driver identified by the acquired driver identification information (Step S1020). Therefore, even in cases where a vehicle is driven by plural drivers, the driving behavior of each of the plural drivers can be predicted based on the tendency in driving of each of the plural drivers.

The template $T^{mr}$ represents behavior models (average data group $UG^m$), which are time-series patterns, extracted while being shifted by a predetermined period for every extraction (Step S150). Therefore, even in cases where a characteristic change pattern occurs earlier or later than in average cases, such a characteristic change pattern can be captured without fail making it possible to accurately predict the behavior of the driver.

When the result of prediction made by the driving behavior prediction process (Step S1050) does not agree with the behavior to be practiced by the driver at an object point (Steps S1510, S1520, and S1550), a voice announcement to that effect is outputted (Steps S1540 and S1560). As a result, the driver can recognize in advance how to behave at the object point, so that the driver can be prevented from practicing wrong behavior.

The navigation system 10 in the above embodiment may be designated as a driving behavior prediction apparatus in a more conceptually-oriented term. Likewise, the position detector 11 and the outside communication device 14 may be designated as a position information acquisition unit, and the map data inputter 15 may be designated as a route information acquisition unit. Also, the distance calculation section 32 may be designated as a distance calculation unit. Also, the onboard LAN communication section 21 may be designated as a driving data acquisition unit. Also, the memory (RAM) in the control unit 19 may be designated as a template storage unit. Also, the memory (RAM) in the control unit 19 may be designated as a template storage unit and a weighting factor storage unit. Also, the process in S1050 may be designated as a driving behavior prediction unit. Also, the process in S1110 may be designated as a driving behavior recognition unit. Also, the process in S1404 may be designated as a first weighting factor update unit. Also, the predetermined distance for starting checking may be designated as a predetermined permissible distance. Also, the template weighting factor $\alpha_t(r_i)$ may be designated as a weighting factor.

Further, the process in S1411 may be designated as a second weighting factor update unit. Also, the threshold value TH may be designated as a predetermined criterion. Also, the process in S1540 and S1560 may be designated as a voice output unit.

Although the present invention has been fully described in connection with the preferred embodiment thereof with reference to the accompanying drawings, it is to be noted that various changes and modifications will become apparent to those skilled in the art.

For example, the voice guidance provided at a guidance point such as an intersection in the above embodiment may also be provided at a branch point such as an expressway ramp or the like.

Further, the voice warning (S1090) in the above embodiment may alternatively be provided by an image displayed on the display section 16.

Furthermore, the vehicle information used in a prediction of the driver's behavior may also include operation information of the driver affecting the running condition of the own vehicle other than the speed V, brake operation magnitude B, or accelerator opening A. The number of such parameters may be more than 4, or less than two.

Furthermore, the template weighting factor $\alpha_t(r_i)$ derived by averaging plural weighting factors for substituting missing weighting factor for the present driver may alternatively prepared by using a predetermined weighting factor value.

Such changes and modifications are to be understood as being within the scope of the present invention as defined by the appended claims.

What is claimed is:

1. A driving behavior prediction method comprising:
   a first step of acquiring a current position of a subject vehicle;
   a second step of acquiring a driving route to be followed by the subject vehicle;
   a third step of calculating an object point distance which is a distance to an object point indicated by the route information based on position information acquired by the first step and route information acquired by the second step;
   a fourth step of acquiring driving data including information on a speed of the subject vehicle and information on a vehicle operation performed by a driver to affect a running condition of the subject vehicle;
   a fifth step of predicting the driving behavior of the driver at the object point based on a history of the driving data acquired by the fourth step, a plurality of templates, and a weighting factor for each of the plurality of templates when a distance determined by the third step is within a predetermined permissible distance;
   a sixth step of recognizing the driving behavior actually practiced by the driver at the object point; and
   a seventh step of updating the weighting factor for each of the plurality of templates, wherein, when the predicted driving behavior agrees with the recognized driving behavior in a comparison between a prediction result by the fifth step and a recognition result by the sixth step, the seventh step updates the weighting factor for each of relevant templates that is used for generating the prediction result in a manner that increases a reliability of a prediction of the driving behavior by using the plurality of templates.

2. A driving behavior prediction apparatus comprising:
   a position information acquisition unit that acquires a current position of a subject vehicle;
   a route information acquisition unit that acquires a driving route to be followed by the subject vehicle;
   a distance calculation unit that calculates an object point distance which is a distance to an object point indicated by the route information based on position information acquired by the position information acquisition unit and route information acquired by the route information acquisition unit;
   a driving data acquisition unit that acquires driving data including information on a speed of the subject vehicle and information on a vehicle operation performed by a driver to affect a running condition of the subject vehicle;

a template storage unit that stores a plurality of templates representing typical patterns of a driving behavior of the driver;

a weight storage unit that stores a weighting factor for each of the plurality of templates;

a driving behavior prediction unit that predicts the driving behavior of the driver at the object point based on a history of the driving data acquired by the driving data acquisition unit, the plurality of templates stored in the template storage unit, and the weighting factor for each of the plurality of templates stored in the weight storage unit when a distance determined by the distance calculation unit is within a predetermined permissible distance;

a driving behavior recognition unit recognizes the driving behavior actually practiced by the driver at the object point; and a first weight update unit that updates the weighting factor for each of the plurality of templates, wherein, when the predicted driving behavior agrees with the recognized driving behavior in a comparison between a prediction result by the driving behavior prediction unit and a recognition result by the driving behavior recognition unit, the first weight update unit updates the weighting factor of the for each of relevant templates that is used for generating the prediction result in a manner that increases a reliability of a prediction of the driving behavior by using the plurality of templates.

3. The driving behavior prediction apparatus of claim 2, wherein the first weight update unit updates the weighting factor for each of the relevant templates in a manner that increases the reliability in proportion to the object point distance at the time of predicting the driving behavior.

4. The driving behavior prediction apparatus of claim 3, wherein the first weight update unit updates the weighting factor for each of the relevant templates by adding a reward for increasing the reliability of each of the relevant templates, and the reward is configured to increase in geometric progression in proportion to the object point distance.

5. The driving behavior prediction apparatus of claim 2, wherein the first weight update unit updates the weighting factor for each of the relevant templates every time the subject vehicle passes the object point.

6. The driving behavior prediction apparatus of claim 2 further comprising:

a second weight update unit that updates the weighting factor of a for each of the relevant templates, wherein, when the predicted driving behavior disagrees with the recognized driving behavior in a comparison between a prediction result by the driving behavior prediction unit and a recognition result by the driving behavior recognition unit, the second weight update unit updates the weighting factor for each of the relevant templates that is used for generating the prediction result in a manner that decreases a reliability of a prediction of the driving behavior by using the relevant templates.

7. The driving behavior prediction apparatus of claim 6, wherein the driving behavior prediction unit determines a similarity between the plurality of templates and the history of the driving data, the similarity is determined based on a product of a discrepancy value and the weighting factor for each of the relevant templates, the discrepancy value is defined as a value that indicates discrepancy between the history of the driving data acquired by the driving data acquisition unit and the plurality of templates, the driving behavior prediction unit predicts that the driving behavior of the driver at the object point becomes substantially same as the driving behavior indicated by the plurality of templates when a template having the similarity that is greater than a predetermined criterion exists, and the second weight update unit updates the weighting factor for each of the relevant templates based on a difference between the similarity and the predetermined criterion.

8. The driving behavior prediction apparatus of claim 6, wherein the second weight update unit updates the weighting factor every time the subject vehicle passes the object point.

9. The driving behavior prediction apparatus of claim 2 further comprising:

a driver recognition unit that recognizes a driver of the subject vehicle, wherein the weight storage unit stores the weighting factor that corresponds to respective drivers recognized by the driver recognition unit, and the driving behavior prediction unit predicts the driving behavior based on the weighting factor that corresponds to the driver recognized by the driver recognition unit.

10. The driving behavior prediction apparatus of claim 2, wherein each of the plurality of templates is a time-series pattern that is generated by classifying driving patterns identified by collected data that includes at least one of pre-collected driving data and pseudo-driving data that simulates the driving data.

11. The driving behavior prediction apparatus of claim 10, wherein each of the plurality of templates is generated by extracting the time-series pattern from the driving data in a manner that shifts the time-series pattern by a predetermined shift period.

12. The driving behavior prediction apparatus of claim 2, wherein the object point at least includes a branch point in the driving route, and the driving behavior prediction unit predicts as the driving behavior whether the subject vehicle turns at the branch point.

13. The driving behavior prediction apparatus of claim 2, wherein the information on the vehicle operation includes operation information on at least one of an accelerator pedal and a brake pedal.

14. The driving behavior prediction apparatus of claim 2 further comprising:

a voice output unit that outputs a voice message of discrepancy that indicates discrepancy of a prediction result and a driver's expected behavior when the prediction result by the driving behavior prediction unit disagree with the driver's expected behavior at the object point.

15. The driving behavior prediction apparatus of claim 2 further comprising:

an image output unit that displays a message of discrepancy that indicates discrepancy of a prediction result and a driver's expected behavior when the prediction result by the driving behavior prediction unit disagree with the driver's expected behavior at the object point.

* * * * *